No. 663,935. Patented Dec. 18, 1900.
M. A. SCHMITT.
CLUTCH MECHANISM FOR LOOMS.
(Application filed July 18, 1900.)
(No Model.)

WITNESSES:
Wm. S. Bell.
Robert J. Pollitt.

INVENTOR,
Martin A. Schmitt,
BY
Garhert Steward,
ATTORNEYS.

UNITED STATES PATENT OFFICE.

MARTIN A. SCHMITT, OF PATERSON, NEW JERSEY.

CLUTCH MECHANISM FOR LOOMS.

SPECIFICATION forming part of Letters Patent No. 663,935, dated December 18, 1900.

Application filed July 18, 1900. Serial No. 24,030. (No model.)

*To all whom it may concern:*

Be it known that I, MARTIN A. SCHMITT, a subject of the Emperor of Germany, residing in Paterson, in the county of Passaic and State of New Jersey, have invented certain new and useful Improvements in Clutch Mechanisms for Looms; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to clutch mechanisms or couplings for connecting revoluble shafts or other similar parts.

One of the objects of the invention is to provide a simply-constructed clutch or coupling for revoluble shafts, &c., of such nature that, while it serves as an efficient medium for transmitting power from the driving-shaft to the driven shaft, the latter will be automatically released from the former upon the minimum extraordinary resistance to its rotation being offered by any foreign body.

A further object of the invention is to provide means, in combination with such a clutch or coupling, for throwing the driving-shaft out of connection with its own driving means simultaneously with the release of the two shafts from each other.

My invention will be found of great value when employed in connection with machines the character of whose work necessitates the instantaneous disconnection of certain of their power-transmitting parts should any accident or other unusual circumstance affecting their proper operation at any time arise. I have therefore shown my invention in the accompanying drawings with a loom of the type known as the "Knowles" loom, such loom being ordinarily provided with a clutch connecting the vertical shaft for transmitting power to the head-motion of the loom, with its driving means.

Figure 1:
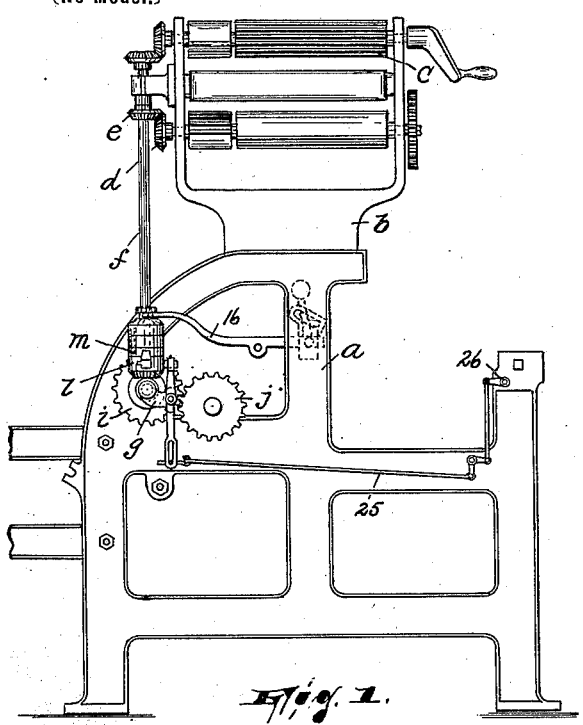
Figure 2:
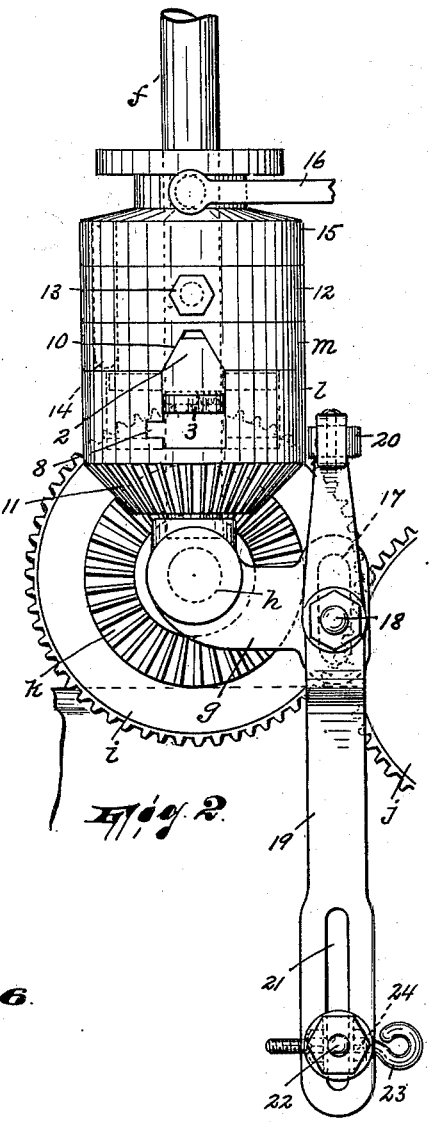
Figures 3, 4, 5, 6:
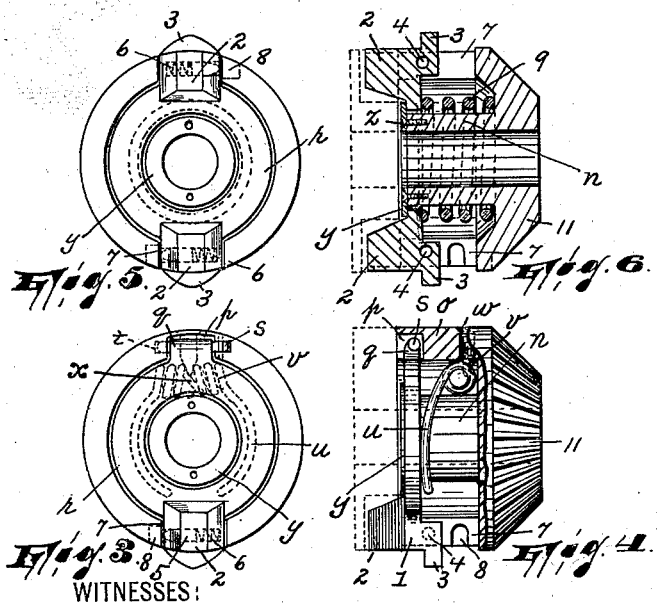

In said drawings, Figure 1 is a view in side elevation of a loom provided with a mechanism constructed after the principles of my invention. Fig. 2 is an enlarged view, in side elevation, of said mechanism. Figs. 3 and 4 are respectively a top plan view and a view in side elevation, partly in section, of one form of driving member for the clutch of said mechanism; and Figs. 5 and 6 are respectively a top plan view and a sectional view of another form of said member of said clutch.

$a$ in said drawings designates a loom provided with a head-motion $b$, which, as usual, comprises mechanism for controlling the harness and also for controlling the boxes of the loom. Said mechanism includes fluted rollers $c$, which are driven by bevel-gearing $d$, meshing with other bevel-gearing $e$ on a vertical revoluble shaft $f$, which is stepped in a bracket $g$, carried by a stub-shaft $h$, projecting from the loom-frame. On the stub-shaft $h$ is journaled a gear $i$, in mesh with another gear $j$, which is driven in any suitable manner, said gear $i$ having formed with it upon its outer face a bevel-gear $k$.

$l$ and $m$ designate, respectively, the driving and driven members of my clutch. The member $l$ is substantially cup-shaped and is formed with an internal hub or bushing $n$, which is adapted to receive the shaft $f$, upon which said member may loosely turn. Cut into the top portion of the circular wall $o$ of the member $l$ is a recess $p$, which is adapted to receive a projection $q$ on a latch $r$, in the shape of an annulus which is disposed in the cavity of said member surrounding its hub or bushing. The projection $q$ is provided with trunnions $s$, which are received by suitable recesses $t$, communicating with the recess $p$. Also in the cavity of said member is disposed a spring, the same consisting of a piece of wire having its extremities $u$ slightly curved and receiving the hub or bushing $n$ and having its intermediate portion in the shape of spaced coils $v$. In the wall $o$ of the member is arranged a set-screw $w$, whose inner end is adapted to impinge against the part $x$ of the spring which connects its coils and which is adapted to be manipulated so as to adjust the spring, it being observed that said part $x$ is on the side of the axial line of the coils which is adjacent the bottom wall of said member. The spring presses the latch outwardly. In order to limit the outward movement of the latch to the position in which it is shown in the drawings, an annular disk $y$, of greater diameter than the opening in said latch, may be secured upon the upper end of the bushing or hub, as by screws z.

Diametrically opposite to the projection q of the latch is another projection 1, which is formed upon its upper face with a lug 2, having its side faces convergently disposed. Said projection is also provided with another lug 3, which is disposed to extend beyond the periphery of the member. In said projection is formed a bore 4, which is open at one end and in which is arranged a pawl 5, which is actuated by a spiral spring 6, disposed between said pawl and the closed end of the bore. By pressing upon the latch as the projection 1 enters a recess 7, formed for it in the wall o of the member, the pawl will enter a notch 8, formed in said wall and opening outwardly, as well as toward said recess, so as to lock the latch down. It should be remarked that the free end of the pawl is rounded, so that a suitable implement may be inserted in the notch to unseat the pawl and so release the latch.

In that form of the member l which I show in Figs. 5 and 6 instead of pivoting the latch said latch is arranged for rectilinear movement in the member, being normally pressed outwardly against the disk y by a spiral spring 9, which is coiled about the bushing. It is preferred that the lugs 2, the lugs 3, and the means for locking the latch down be duplicated in this case, being disposed at diametrically opposite points in the member.

The member m of the clutch consists simply of a disk having a central bore through which the shaft f is adapted to extend, said disk being provided with a recess 10, formed in its under face, to fit the lug 2. Should the driving clutch member shown in Figs. 5 and 6 be employed, the recess 10 in the driven member will of course be duplicated.

Power is transmitted from the bevel-gear k to the clutch through the medium of another bevel-gear 11, which meshes with said first-named bevel-gear and which preferably forms an integral part of the driving member, as shown in the drawings.

Power is transmitted from the clutch to the shaft f by means of a disk 12, which is secured upon the shaft above the clutch by the binding-screw 13, the connection between said disk and the driven member of the clutch being afforded by a pin 14, which penetrates them and is carried by a grooved block 15, which is arranged above the disk 12 and is adapted to be manually controlled by a fork 16, that is fulcrumed in the frame.

In the bracket h is formed a vertical slot 17, in which may be adjustably secured a bolt 18, which forms a fulcrum for a lever 19, carrying a roller 20 at its upper end and at its lower end being provided with a vertical slot 21, in which is secured a bolt 22, whose head receives a threaded hook 23, held in place by binding-nuts 24. Said hook is adapted to be connected through suitable mechanism 25 with a throw-out rod 26, which connects with a belt-shifter or other mechanism for throwing off the power whereby the loom is driven. It should be remarked that the roller 20 normally bears against the periphery of the member l of the clutch in a portion thereof which includes the lower part of the entrance to the recess or recesses 7.

It should be remarked that the beveling of the lug or lugs 2 should be at such an angle that the release of the members of the lug will not be effected when a drag or resistance is offered under ordinary circumstances, as in maintaining their motion after once being started or in overcoming the inertia of the parts to be driven at the starting. If this is so, when any extraordinary resistance is offered to the shaft f as it rotates, as if parts of the head-motion are not operating properly or something interferes with the proper action of the bevel-gears d e, the drag on the member m will be such that the latch r will be depressed against the tension of the spring, which actuates it until the pawl 5 registers with the notch 8, and the latch is locked down by said pawl being forced into the notch by its spring. The member l will then be free to rotate independently of the member m, and so the power to the shaft will be cut off. The latch having been thus locked down, as the member l continues to rotate the projecting lug 3 on said latch will meet with the roller 20, thus actuating the lever 19, which through the mechanism 25 and the throw-out rod 26 will throw the power off the machine. When the machine is ready for starting again, it is only necessary before reapplying the power to insert a suitable implement in the notch 8, as hereinbefore stated, to release the pawl 5 and unlock the latch, which under tension of its spring will enter the recess 10 of the member m as soon as it reaches it in its rotation.

The manual operation of the head-motion may be effected without disturbing the connection between the clutch members by simply elevating the block 15 until the pin 14 clears the member m, and so disconnects the clutch from the shaft.

Having thus fully described my invention, what I claim as new, and desire to secure by Letters Patent, is—

1. In a clutch mechanism, the combination of a hollow driving member, a driven member having a recess in the face thereof adjacent said driving member, said members normally abutting the one against the other and a spring-actuated latch fulcrumed in said driving member and having a beveled lug adapted to enter said recess, said recess being shaped to conform substantially to the lug, substantially as described.

2. In a clutch mechanism, the combination, with a shaft to be driven, of a driven clutch member arranged on said shaft and rigidly connected thereto, a cup-shaped driving clutch member normally abutting against said driven clutch member, said driven clutch member having a recess in the face thereof adjacent said driving member, a latch fulcrumed in said driving clutch member and having a beveled lug adapted to enter said recess, said recess being shaped to substantially conform to said lug, and a spring inclosed in said driving clutch member and bearing against said latch, substantially as described.

3. The combination of a driving clutch member, a driven clutch member, a latch carried by one of said members, normally engaging the other member to connect said members, and movable to either of two positions, said latch being adapted to be moved from one position to the other when the disconnection of said members occurs, a movable part adapted to be operatively connected to the power-controlling means of the machine including said clutch members, and a lug projecting from said latch and adapted to engage said part to actuate the same whenever the latch is in one of said positions, substantially as described.

4. In a clutch mechanism, the combination of a driving clutch member, a driven clutch member, a spring-actuated latch arranged in said driving member and having a beveled lug adapted to engage the driven member, said latch being adapted to be depressed when said clutch members move independently of each other, and automatic locking means for said latch adapted to secure the same when depressed, substantially as described.

5. In a clutch mechanism, the combination of a driving clutch member, a driven clutch member, a spring-actuated latch arranged in said driving member and having a beveled lug adapted to engage the driven member, said latch being adapted to be depressed when said clutch members move independently of each other, and a spring-actuated pawl carried by said latch, said driving clutch member having a recess adapted to receive said pawl when the latch is depressed, substantially as described.

6. The combination of a driving clutch member, a driven clutch member, one of said members having a beveled projection engaging the other member and adapted to move the one of said members from the other when they rotate independently, and a suitably-fulcrumed lever adapted to be operatively connected to the power-controlling means of the machine including said clutch members and to be engaged by said movable member to be actuated thereby upon the movement thereof, substantially as described.

7. The combination of a driving clutch member, a driven clutch member, a latch carried by one of said members and having a beveled lug engaging the other member, said lug being adapted to move the latch when the clutch members are moved independently, and a suitably-fulcrumed lever adapted to be operatively connected to the power-controlling means of the machine and to be engaged by said latch to be actuated thereby upon the movement thereof, substantially as described.

In testimony that I claim the foregoing I have hereunto set my hand this 29th day of June, 1900.

MARTIN A. SCHMITT.

Witnesses:
ALFRED GARTNER,
ROBERT J. POLLITT.